(12) United States Patent
Wang et al.

(10) Patent No.: US 12,131,499 B2
(45) Date of Patent: Oct. 29, 2024

(54) CAMERA ORIENTATION ESTIMATION

(71) Applicant: TUSIMPLE, INC., San Diego, CA (US)

(72) Inventors: Yijie Wang, San Diego, CA (US); Lingting Ge, San Diego, CA (US); Yiqian Gan, San Diego, CA (US); Xiaodi Hou, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/339,940

(22) Filed: Jun. 22, 2023

(65) Prior Publication Data

US 2023/0334696 A1 Oct. 19, 2023

Related U.S. Application Data

(63) Continuation of application No. 17/531,447, filed on Nov. 19, 2021, now Pat. No. 11,721,038, which is a
(Continued)

(51) Int. Cl.
*G06T 7/73* (2017.01)
*G06T 7/33* (2017.01)

(52) U.S. Cl.
CPC ............... *G06T 7/74* (2017.01); *G06T 7/337* (2017.01); *G06T 2207/30184* (2013.01); *G06T 2207/30252* (2013.01)

(58) Field of Classification Search
CPC .. G06T 7/30; G06T 7/33; G06T 7/337; G06T 7/70; G06T 7/73; G06T 7/74;
(Continued)

(56) References Cited

U.S. PATENT DOCUMENTS 11,189,051 B2 11/2021 Wang et al.
11,721,038 B2 * 8/2023 Wang et al. ............ G06T 7/74
382/195
(Continued)

FOREIGN PATENT DOCUMENTS

EP 0390052 A2 10/1990

OTHER PUBLICATIONS

Extended European Search Report for European Patent Application No. 20203066.4, mailed Mar. 18, 2021.
(Continued)

*Primary Examiner* — Andrew W Johns
(74) *Attorney, Agent, or Firm* — Perkins Coie LLP

(57) ABSTRACT

Techniques are described to estimate orientation of one or more cameras located on a vehicle. The orientation estimation technique can include obtaining an image from a camera located on a vehicle while the vehicle is being driven on a road, determining, from a terrain map, a location of a landmark located at a distance from a location of the vehicle on the road, determining, in the image, pixel locations of the landmark, selecting one pixel location from the determined pixel locations; and calculating values that describe an orientation of the camera using at least an intrinsic matrix and a previously known extrinsic matrix of the camera, where the intrinsic matrix is characterized based on at least the one pixel location and the location of the landmark.

20 Claims, 5 Drawing Sheets

Related U.S. Application Data continuation of application No. 16/663,242, filed on Oct. 24, 2019, now Pat. No. 11,189,051.

(58) Field of Classification Search
CPC .......... G06T 2207/30244; G06T 2207/30252; G06V 20/56; G06V 20/58; G06V 20/582; G06V 20/588; G05D 1/0231; G05D 1/0246; G05D 1/0274; G05D 1/0276; G05D 1/0278

See application file for complete search history.

(56) References Cited

U.S. PATENT DOCUMENTS

| | | |
|---|---|---|
| 2018/0045519 A1 | 2/2018 | Ghadiok et al. |
| 2018/0188736 A1 | 7/2018 | Jian et al. |
| 2018/0307238 A1 | 10/2018 | Wisniowski |
| 2020/0082565 A1 | 3/2020 | Klimovich et al. |
| 2020/0334857 A1 | 10/2020 | Garud et al. |
| 2020/0372285 A1 | 11/2020 | Adams et al. |
| 2022/0076446 A1 | 3/2022 | Wang et al. |

OTHER PUBLICATIONS

Examination Report from corresponding European Patent Application No. 20203066.4, dated Nov. 24, 2023, (6 pages).

* cited by examiner

CAMERA ORIENTATION ESTIMATION

CROSS-REFERENCE TO RELATED APPLICATIONS

This application is a continuation of U.S. patent application Ser. No. 17/531,447, filed on Nov. 19, 2021, which is a continuation of U.S. patent application Ser. No. 16/663,242, filed on Oct. 24, 2019 and is now U.S. Pat. No. 11,189,051. The aforementioned applications are incorporated by reference in their entireties.

TECHNICAL FIELD

This document relates to techniques to estimate an orientation of a camera on an autonomous vehicle.

BACKGROUND

A vehicle may include cameras attached to the vehicle for several purposes. For example, cameras may be attached to a roof of the vehicle for security purposes, for driving aid, or for facilitating autonomous driving. Cameras mounted on a vehicle can obtain images of one or more areas surrounding the vehicle. These images can be processed to obtain information about the road or about the objects surrounding the autonomous vehicle. Thus, the images obtained from the cameras on an autonomous vehicle can be used to safely maneuver the autonomous vehicle through traffic or on a highway.

SUMMARY

Techniques are disclosed for estimating an orientation of camera located on an autonomous vehicle. An orientation of a camera can be estimated based on a landmark detected from an image obtained by the camera as the autonomous vehicle is being driven. The exemplary techniques can also be used to estimate one or more additional orientations of one or more additional cameras on the autonomous vehicle based on the estimated orientation of the camera and based on previously known relative positions of the camera and the one or more additional cameras.

In an exemplary embodiment, a method of estimating camera orientation, comprises obtaining an image from a camera located on a vehicle while the vehicle is being driven on a road; determining, from a terrain map, a location of a landmark located on the road and at a distance from a location of the vehicle on the road, where the location of the vehicle is associated with a time when the image is obtained by the camera, and where the terrain map provides coordinates of points in a spatial region in which the vehicle is being driven; determining, in the image, pixel locations of the landmark; selecting one pixel location from the determined pixel locations; and calculating values that describe an orientation of the camera using at least an intrinsic matrix and a previously known extrinsic matrix of the camera, where the intrinsic matrix is characterized based on at least the one pixel location and the location of the landmark In some embodiments, the pixel locations of the landmark is determined by: making a first determination that the landmark is oriented in a direction to face the camera, making a second determination that the location of the landmark is within a field of view of the camera, and in response to making the first determination and the second determination: determining a number of pixels to detect at least some of the landmark in the image; detecting the at least some of the landmark occupying the number of pixels in the image; and identifying the pixel locations of the number of pixels that include the at least some of the landmark. In some embodiments, the number of pixels is determined based on the distance between the location of the landmark and the location of the vehicle.

In some embodiments, the exemplary method further comprises, in response to determining that the location of the landmark is outside of a field of view of a second camera located on the vehicle: calculating a second set of values that describe a second orientation of the second camera based on the calculated values of the camera and based on previously known relative positions of the camera and the second camera.

In some embodiments, the one pixel location is selected to be same as a geometric center of the determined pixel locations. In some embodiments, the landmark includes a pole, an object placed on the road, or a traffic road sign.

In yet another exemplary aspect, the above-described method is embodied in the form of processor-executable code and stored in a computer-readable storage medium. Thus, a non-transitory computer readable storage medium can have code stored thereon, where the code, when executed by a processor, causes the processor to implement the method described in this patent document.

In yet another exemplary embodiment, an image processing apparatus or device that includes a processor that is configured or operable to perform the above-described methods is disclosed.

The above and other aspects and their implementations are described in greater detail in the drawings, the descriptions, and the claims.

DETAILED DESCRIPTION

When a vehicle is driven to its destination, the cameras mounted on the vehicle can experience vibrations from the vehicle or from forces exerted by environmental elements, such as wind. A computer onboard a vehicle performs image processing on images obtained by the camera to determine distances to various objects in the images based on at least the pre-determined positions and orientations of the cameras. However, when a camera experiences vibration, the camera's orientation may temporarily or permanently change, which can change the relative orientation between the camera and a localization device (e.g., global positioning system (GPS) unit and/or inertial measurement unit (IMU)) located on or within the vehicle. Such an event can affect the reliability of the information derived from an image obtained from the camera. For example, when a camera's orientation changes, a computer cannot reliably or precisely determine locations of objects on an image obtained by the camera if the computer relies on an extrinsic matrix that describes the previous orientation of the camera and/or if the computer relies on the relative orientation between the camera and the vehicle's localization device.

This patent document describes techniques to estimate orientation of cameras located on a vehicle. The disclosed techniques can estimate with high accuracy the orientation of multiple cameras mounted on a vehicle based on a landmark that may be located on a road. A landmark may include pole, specially placed object (e.g., a cardboard with a matrix barcode, a uniquely colored traffic code, or a light beacon that can be placed on the road), or a traffic road sign (e.g., a stop sign, a yield sign, or a speed limit sign). Thus, in an exemplary embodiment, an orientation of a camera can be estimated based on a landmark detected from an image obtained by the camera while the autonomous vehicle is being driven. In some embodiments, one or more additional orientations of one or more additional cameras on the autonomous vehicle can be estimated based on the estimated orientation of the camera and based on previously known relative positions of the camera and the one or more additional cameras.

Figure 1:
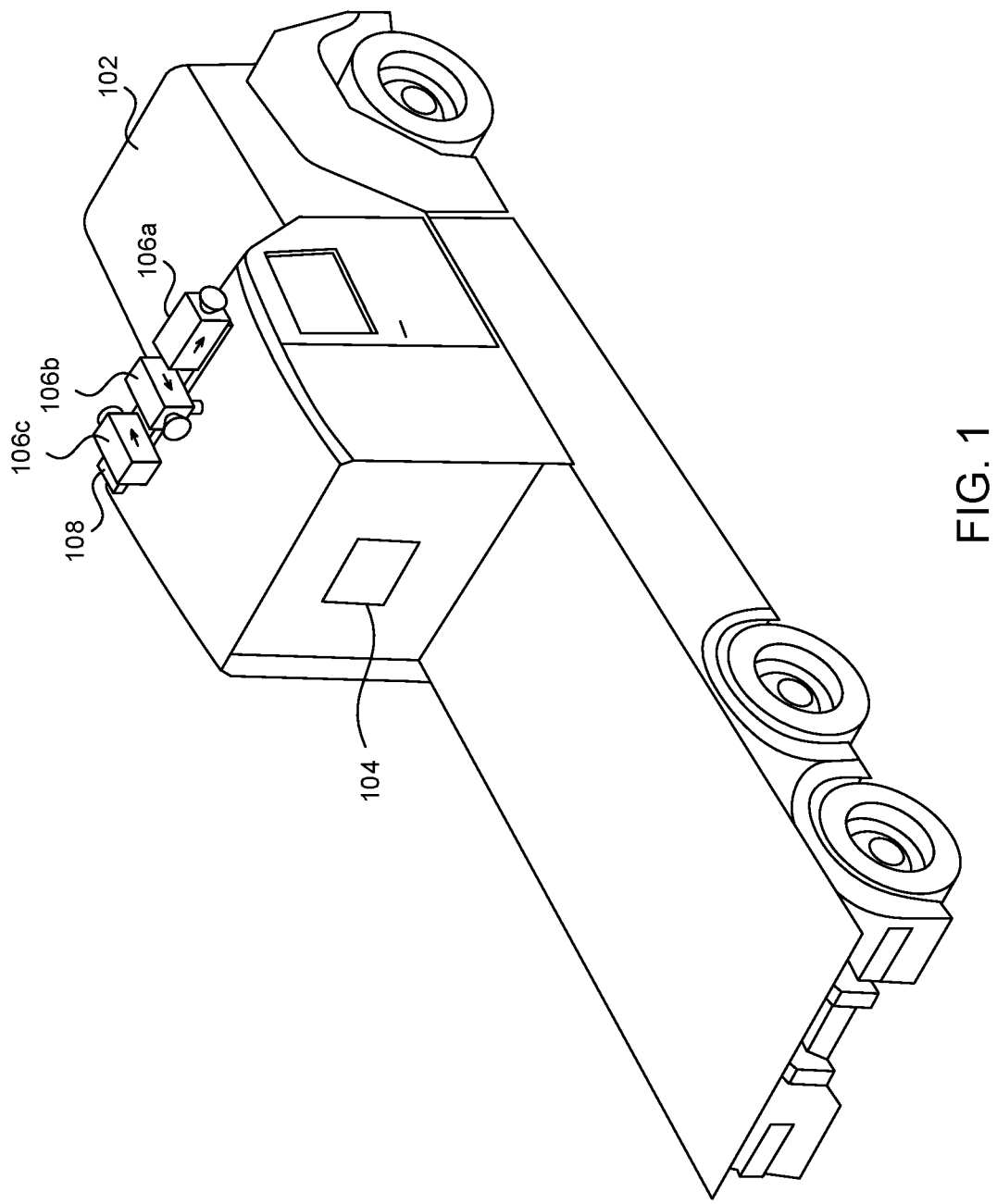
FIG. 1 shows a rear view of a vehicle that includes a localization device and cameras mounted on a mounting platform.

FIG. 1 shows a rear view of a vehicle 102 that includes a localization device 104 and cameras 106a-106c mounted on a mounting platform 108. A localization device 104 is located on or within the vehicle 102 and can include a global positioning system (GPS) unit and/or an inertial measurement unit (IMU). The localization device 104 provides location information of the vehicle in a spatial region where the vehicle is located or being driven. The location information can include three-dimensional (3D) world coordinates or GPS coordinates of localization device 104 of the vehicle. The spatial region includes an environment that surrounds the vehicle, where the environment includes a road or surface on which the vehicle is being driven or located.

FIG. 1 shows three cameras 106a-106c mounted on a mounting platform 108 on top of a roof a vehicle 102. An example of a mounting platform 108 can be a rigid bar to which the cameras 106a-106c can be directly or indirectly coupled. Since the cameras 106a-106c are coupled to the mounting platform 108, the relative positions between the cameras 106a-106c are previously known. The cameras 106a-106c are shown to be mounted in different directions to allow the cameras to obtain images from various regions surrounding the vehicle 102. For example, since FIG. 1 shows a rear view of the vehicle 102, camera 106c is shown to capture images from a location in front and/or side of the vehicle, camera 106b is shown to capture images from a location to the rear and/or side of the vehicle 102, and camera 106a is shown to capture images from a location to a side of the vehicle 102. The techniques to estimate an orientation of a camera can be applied to each of the three cameras or additional cameras located on the vehicle.

Figure 2:
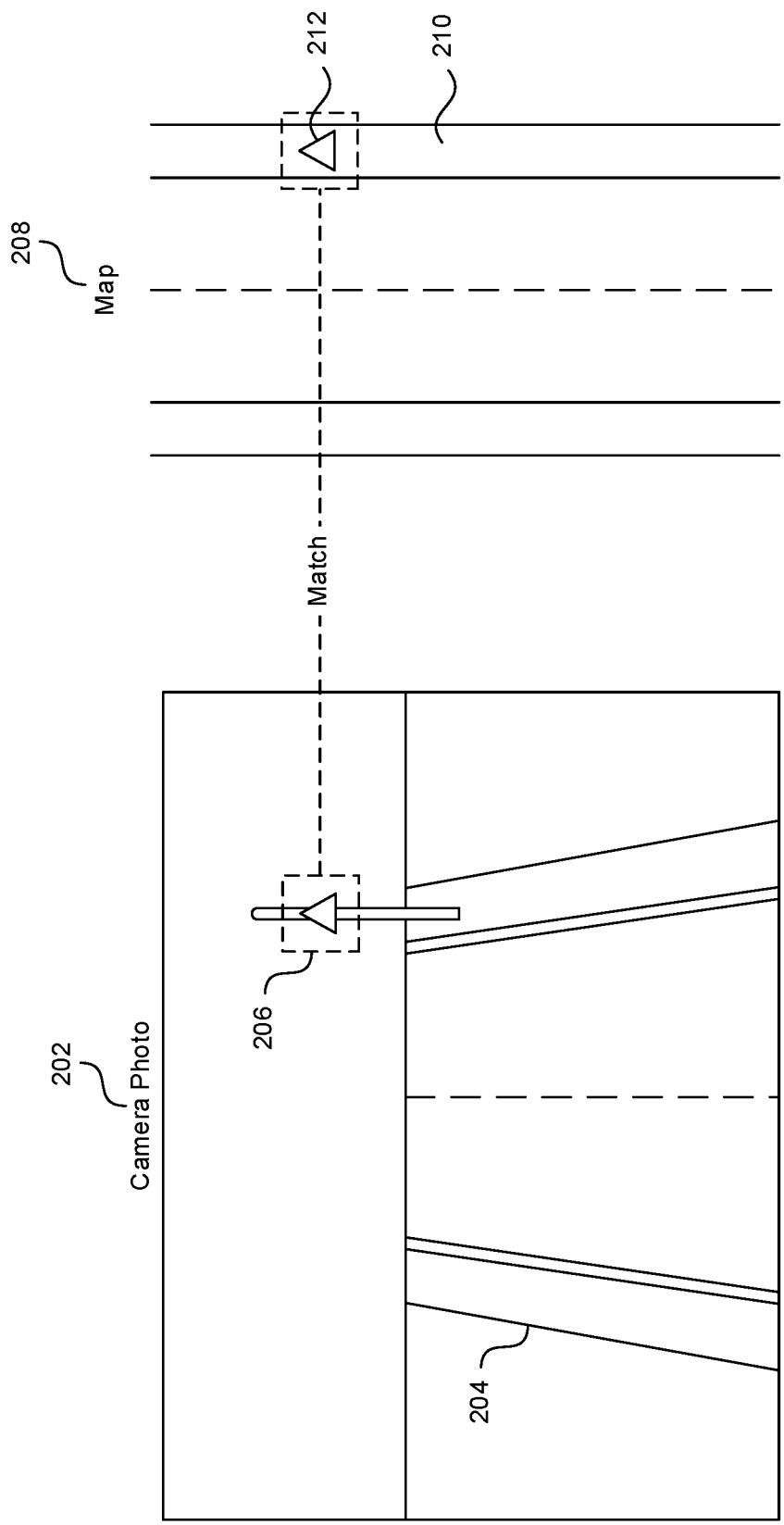
FIG. 2 shows an example image processing technique where a landmark is detected in an image obtained from a camera based at least on a location of a vehicle that includes the camera and based on a location of the landmark in a terrain map.

FIG. 2 shows an example image processing technique a landmark detected in an image obtained from a camera on a vehicle is matched to a location of the landmark in a terrain map. A landmark may be located the road. For instance, a stop sign indicates that a vehicle much come to a complete stop at a stop sign, or a speed limit sign indicates that a vehicle must drive at a speed less than or equal to the indicated speed limit on some part of the road. The camera photo 202 shown on the left side of FIG. 2 can be an image obtained by a front facing camera (e.g., camera 106c in FIG. 1). The image obtained by the camera can include a road 204 and a landmark 206 (e.g., a traffic sign) that are within a field of view of the camera as the vehicle is being driven on the road.

The map shown on the right of FIG. 2 is a birds-eye view of a portion of a terrain map 208 that includes a road 210 and a landmark 212. The terrain map provides information about the road on which the vehicle is being driven and the location of various landmarks on the road. In some embodiments, the terrain map can provide 3D world coordinates of various points (e.g., landmarks) in a spatial region in which the vehicle is located or being driven. The terrain map can be stored in a terrain map database (shown as 525 in FIG. 5) in the computer or server (shown as 500 in FIG. 5) located in a vehicle.

The portion of the terrain map shown in FIG. 2 corresponds to a location of the vehicle when the camera photo 202 was obtained by a camera. Each image of captured by the camera can be timestamped by the camera and sent to a landmark module (shown as 530 in FIG. 5) in the computer or server so that the landmark module can use the timestamp information of an image to obtain from the localization device a location of the vehicle on the road at that same time. Based on the location of the vehicle, the landmark module can obtain from the terrain map database a location of a landmark located at a distance from the location of the vehicle on the road. In some implementations, the landmark module can query the terrain map database to obtain one or more landmarks located within a pre-determined distance (e.g., 300 meters) from the location of the vehicle.

The terrain map can also provide information regarding the orientation or the direction in which landmarks face. For example, if the camera photo 202 is obtained as a vehicle is being driven in a northbound direction, the terrain map can indicate that the landmark 206 located within a distance from the vehicle is south-facing so that, as further described below, the landmark pixel location module (shown as 535 in FIG. 5) in the computer or server can determine the pixel location of the landmark 206 in the camera photo 206.

A computer or server located in a vehicle can perform image processing on the images obtained by the one or more camera mounted on the vehicle to detect a landmark in the images. For example, for the camera photo 202 shown in FIG. 2, the landmark pixel location module in the computer or server obtains the image 202 from a camera and determines the pixel locations of the landmark in the image 202. Since an image obtained by a camera may not record a landmark (e.g., an image obtained by camera 302b in the example scenario in FIG. 3), in some embodiments, the landmark pixel location module may efficiently use computational resources by first determining that the location of the landmark is within a field of view of the camera and that the landmark is oriented or is facing the camera. The field of view of each camera mounted on the vehicle is pre-determined since each camera is mounted at a fixed location on a mounted platform and is pointed at a fixed direction.

After the landmark pixel location module determines that the landmark is located within a field of view of the camera and that the landmark is oriented or is facing the camera, the landmark pixel location module determines a number of pixels (or pixel size) that may include at least some of the landmark in the image. Based on the determined number of pixels, the landmark pixel location module can employ an object detection technique (e.g., semantic segmentation technique or a neural network classification technique) to detect the landmark occupying the number of pixels in the image and to identify the pixel locations of the number of pixels that contain or include at least some of the landmark.

Detecting landmarks based on a determined number of pixels is an advantageous technical feature at least because it simplifies and improves computational performance. The number of pixels can be determined or computed based on a rough 3D shape of the landmark, a distance between the vehicle and the landmark, and the relative angle in between an imaginary line from the vehicle to the landmark and a direction in which the landmark faces. The number of pixels can be determined without obtaining any previous orientation value of a camera. Thus, computational performance to detect landmarks based on a number of pixels can be improved by reducing the search space or hypothesis space for the object detection technique. Without the information about the number of pixels that can include at least some portion of the landmark, the search space for object detection technique can include the Cartesian product of position, size and orientation, but with the information about the number of pixels that can include the landmark, the search space can be reduced to the Cartesian product of position and orientation.

In some embodiments, the landmark pixel location module determines the number of pixels based on the distance between the location of the landmark and the location of the vehicle. For example, if the landmark pixel location module determines that the distance between the landmark and the vehicle is 5 meters, then the landmark pixel module can determine that the number of pixels in the image that may represent the landmark may be 50 pixels. In another example, if the distance between the landmark and the vehicle is 20 meters, then the landmark pixel module can determine that the number of pixels in the image that represent the landmark may be 12.5 pixels.

After the landmark pixel location module determines the pixel locations of the number of pixels that contain or include at least some of the landmark, the landmark pixel location module selects one pixel location from the determined pixels locations. The selected one pixel location is sent to a camera orientation module (shown in 540 in FIG. 5) to estimate the orientation of the camera whose image has been processed to determine the pixel location of the landmark. In some embodiments, the landmark pixel location module determines a geometric center of the determined pixel locations, where the geometric center is selected to be the one pixel location that is sent to the camera orientation module for further calculations.

The camera orientation module calculates values that describe an orientation of the camera whose image has been processed to determine the pixel location of the landmark. The orientation values can be calculated using at least an intrinsic matrix and a previously known (or statically calibrated) extrinsic matrix of the camera, where the intrinsic matrix is characterized based on at least the one pixel location and the location of the landmark. The camera orientation values can comprise the 3×3 rotation matrix that is part of the camera's extrinsic matrix.

In an example implementation, the following operations can be performed by the camera orientation module for a pixel location x, y, z on an image plane where an image is obtained by a camera. The pixel location x, y, z can be represented as P ([x y z]) as shown in Equation (1), where the pixel location is normalized:

$$\mathcal{P}([x\ y\ z]^T) = \begin{bmatrix} \frac{x}{z} & \frac{y}{z} \end{bmatrix}^T \quad \text{Equation (1)}$$

The following parameters describe the operations being performed using Equation (2). The number of cameras in a group (e.g., cameras rigidly coupled to a camera mount on a vehicle) can be denoted as C, with the previously known (or statically calibrated) extrinsic matrices of cameras relative to a first camera as $E^{(1)}, \ldots, E^{(C)}$ where the extrinsic matrix of the first camera is $E^{(1)}=I$. The intrinsic matrices corresponding to the cameras can be denoted as $K^{(1)}, \ldots, K^{(C)}$. The location of the vehicle can be $l_0$, the number of visible landmarks in each camera can be $n_1, \ldots, n_C$, and the locations of the visible landmarks in each camera can be $l_1^{(1)}, \ldots, l_{n_1}^{(1)}, \ldots, l_{n_C}^{(C)}$. The corresponding pixel positions of the landmarks can be $p_1^{(1)}, \ldots, p_{n_1}^{(1)}, \ldots, p_{n_C}^{(C)}$. Using these parameters, Equation (2) can be solved for rotation matrix $\tilde{R}$, which includes the camera orientation values, so that the corresponding adjusted extrinsic matrices for each camera can be $$\begin{bmatrix} \tilde{R} & 0 \\ 0 & 1 \end{bmatrix} E^{(1)}, \ldots, \begin{bmatrix} \tilde{R} & 0 \\ 0 & 1 \end{bmatrix} E^{(C)}.$$

$$\min_{\tilde{R} \in SO(3)} \sum_{i=1,\ldots,C} \sum_{j=1,\ldots,n_i} \left\| p_j^{(i)} - \mathcal{P}\left(K^{(i)} \begin{bmatrix} \tilde{R} & 0 \\ 0 & 1 \end{bmatrix} E^{(1)} \begin{bmatrix} l_j^{(i)} - l_0 \\ 1 \end{bmatrix} \right) \right\|_2 \quad \text{Equation (2)}$$

After the orientation values of a camera are determined, the orientation values are stored by the camera orientation module on the computer for that camera so that an image obtained from the camera can be processed by an image processing module (shown as 545 in FIG. 5) with an extrinsic matrix to determine locations of objects in the image based on the determined orientation value for the camera. In some embodiments, when multiple camera orientation values are determined for multiple cameras, the camera orientation module of the computer can determine an average of the multiple camera orientation values and store the averaged value for each camera on the computer so that an image obtained from a camera can be processed by an image processing module with an extrinsic matrix to determine locations of objects in the image based on the averaged orientation value.

Figure 3:
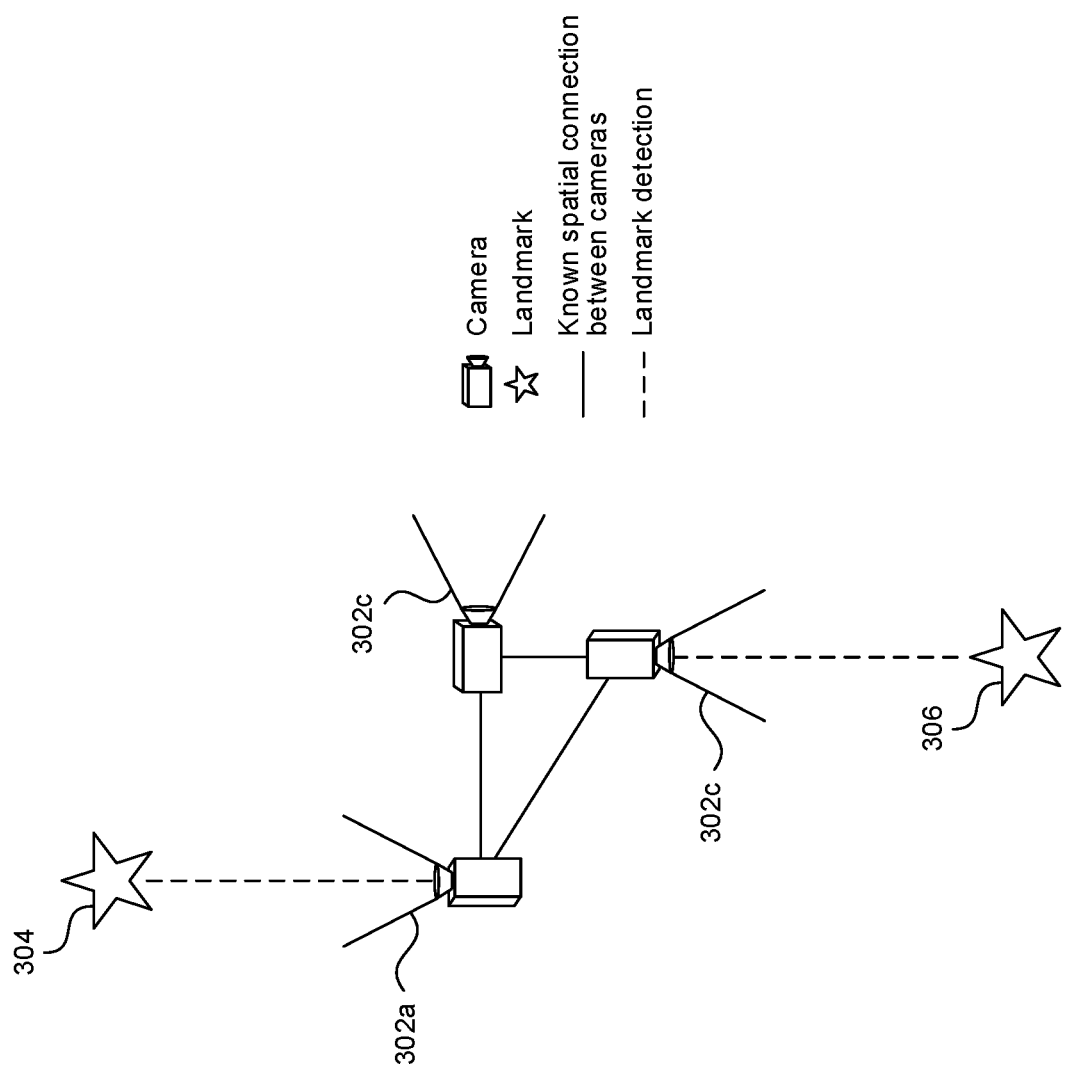
FIG. 3 shows a birds-eye view of three cameras located at known positions relative to each other on an autonomous vehicle where images from at least two cameras are processed to detect separate landmarks.

In some embodiments, one or more cameras mounted on the vehicle can obtain an image of the landmark 206, so that the described camera orientation estimation techniques can be applied to each of the one or more cameras. For example, FIG. 3 shows a birds-eye view of three cameras of FIG. 2 located at known positions relative to each other on an autonomous vehicle where images from at least two cameras 302*a* and 302*c* are processed to detect separate landmarks 304 and 306, respectively. Thus, the camera orientation estimation techniques described above can be jointly or concurrently applied to the images obtained from cameras 302*a* and 302*c* so that the values that respectively describe the orientation of cameras 302*a* and 302*c* can be independently calculated.

FIG. 3 shows that the locations of the landmarks 304 and 306 are outside of the field of view of the side-facing camera 302*b*. In embodiments where a first camera 302*a* obtains an image of a landmark, but a second camera 302*b* does not obtain an image with the same landmark or another landmark, the estimated camera orientation of the first camera 302*a* can be used by the camera orientation module to estimate the orientation values of the second camera based at least on the calculated orientation values of the first camera and based on the previously known relative positions between the first and second cameras. Thus, a technical benefit of the disclosed camera orientation estimation technique is that not all of the cameras need to obtain an image of a landmark to estimate and adjust their respective orientations.

Figure 4:
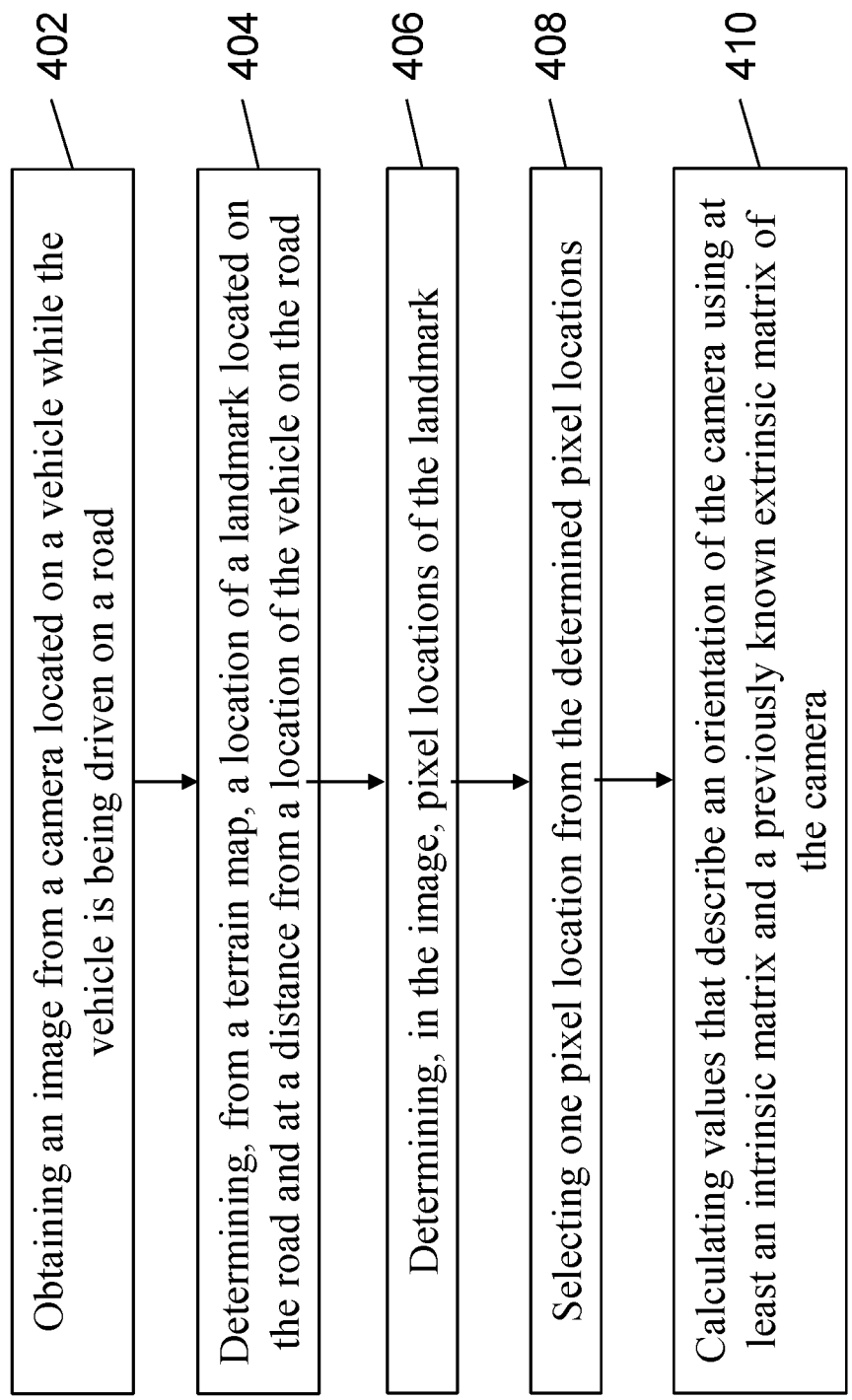
FIG. 4 shows an exemplary flowchart of estimating camera orientation.

FIG. 4 shows an exemplary flowchart of estimating camera orientation. At the obtaining operation 402, a landmark module and landmark pixel location module can obtain an image from a camera located on a vehicle while or as the vehicle is being driven on a road. At the determining operation 404, the landmark module determines, from a terrain map, a location of a landmark located on the road and at a distance from a location of the vehicle on the road. The location of the vehicle can be associated with a time when the image is obtained by the camera, and the terrain map may provide coordinates of points in a spatial region in which the vehicle is being driven. In some embodiments, the landmark includes a pole, an object placed on the road, or a traffic road sign.

At the determining operation 406, the landmark pixel location module determines, in the image, pixel locations of the landmark. In some embodiments, the pixel locations of the landmark is determined by: making a first determination that the landmark is oriented in a direction to face the camera, making a second determination that the location of the landmark is within a field of view of the camera, and in response to making the first determination and the second determination: determining a number of pixels to detect at least some of the landmark in the image; detecting the at least some of the landmark occupying the number of pixels in the image; and identifying the pixel locations of the number of pixels that include the at least some of the landmark. In some embodiments, the number of pixels is determined based on the distance between the location of the landmark and the location of the vehicle.

At the selecting operation 408, the landmark pixel location module selects one pixel location from the determined pixel locations. In some embodiments, the one pixel location is selected to be same as a geometric center of the determined pixel locations. At the calculating operation 410, a camera orientation module calculates values that describe an orientation of the camera using at least an intrinsic matrix and a previously known extrinsic matrix of the camera, where the intrinsic matrix is characterized based on at least the one pixel location and the location of the landmark.

In some embodiments, the method of FIG. 4 further comprises, in response to determining that the location of the landmark is outside of a field of view of a second camera located on the vehicle: calculating a second set of values that describe a second orientation of the second camera based on the calculated values of the camera and based on previously known relative positions of the camera and the second camera.

Figure 5:
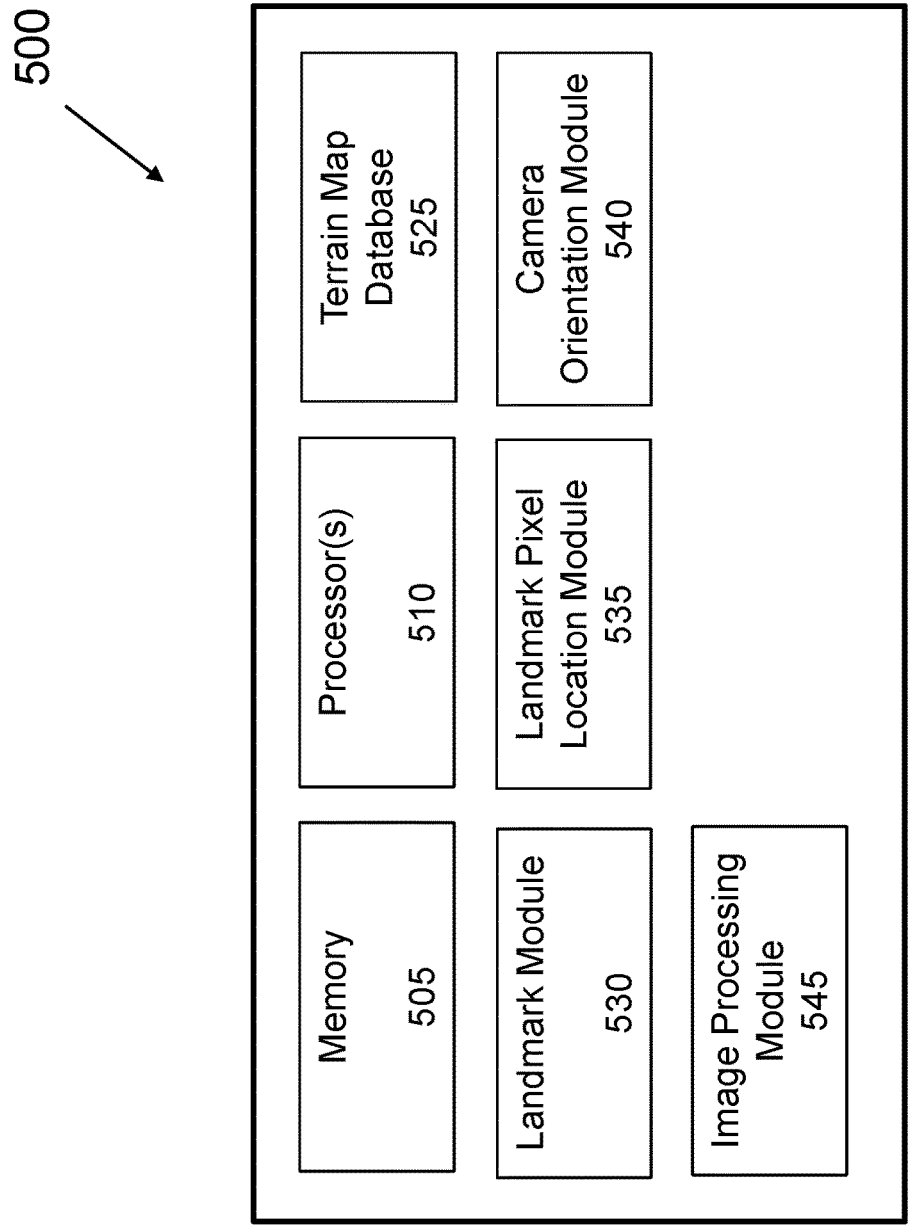
FIG. 5 shows an exemplary block diagram of a computer or server included in an autonomous vehicle.

FIG. 5 shows an exemplary block diagram of a computer or server 500 included in a vehicle as shown in FIG. 1. The computer 500 includes at least one processor 510 and a memory 505 having instructions stored thereupon. The instructions upon execution by the processor 510 configure the computer 500 to perform the operations described for the various modules as described in FIGS. 1 to 4, and/or the operations described for the modules in the various embodiments or sections in this patent document.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of estimating camera orientation, comprising:
obtaining an image from a camera located on a vehicle;
determining a first location of the vehicle based on information associated with the image;
obtaining a second location of a landmark based on the first location of the vehicle,
wherein the second location of the landmark is obtained using a map and the first location of the vehicle,
wherein the map is queried to provide one or more landmarks located within a distance of the first location of the vehicle, and
wherein the one or more landmarks includes the landmark;
determining a third location of a pixel that include at least some of the landmark detected in the image; and
calculating values that describe an orientation of the camera based on the third location of the pixel and the second location of the landmark.

2. The method of claim 1, wherein the landmark in the image is detected by:
performing a first determination that the landmark is within a field of view of the camera and that the landmark is oriented towards the camera;
detecting, after the first determination, the landmark in the image.

3. The method of claim 2, further comprising:
determining, in response to the first determination, a number of pixels that include at least some of the landmark in the image, wherein the landmark is detected in the image after the first determination and based on the number of pixels.

4. The method of claim 3, wherein the number of pixels is determined based on a shape of the landmark in the image.

5. The method of claim 3, wherein the number of pixels is determined based on another distance between the vehicle and the landmark, and wherein the number of pixels is inversely related to the distance between the vehicle and the landmark.

6. The method of claim 3, wherein the number of pixels is determined based on an angle between an imaginary line from the vehicle to the landmark and a direction in which the landmark faces.

7. The method of claim 3, wherein the number of pixels is determined without obtaining a previous orientation value of the camera.

8. A non-transitory computer readable storage medium having code stored thereon, the code, when executed by a processor, causing the processor to implement a method comprising:
obtaining an image from a camera located on a vehicle;
determining a first location of the vehicle based on information associated with the image;
obtaining a second location of a landmark based on the first location of the vehicle,
wherein the second location of the landmark is obtained using a map and the first location of the vehicle,
wherein the map is queried to provide one or more landmarks located within a distance of the first location of the vehicle, and
wherein the one or more landmarks includes the landmark;
determining a third location of a pixel that include at least some of the landmark detected in the image; and
calculating values that describe an orientation of the camera based on the third location of the pixel and the second location of the landmark.

9. The non-transitory computer readable storage medium of claim 8, wherein the map includes landmark related information that indicates a direction in which the landmark faces.

10. The non-transitory computer readable storage medium of claim 8, further comprising:
calculating a second set of values that describe a second orientation of a second camera located on the vehicle, wherein the second set of values is calculated based on the values that describe the orientation of the camera and a previously known relative positions between the camera and the second camera.

11. The non-transitory computer readable storage medium of claim 10, wherein the second set of values are calculated in respond to determining that the second location of the landmark is outside of a field of view of the second camera.

12. The non-transitory computer readable storage medium of claim 8, wherein the image is obtained from the camera while the vehicle is driven on a road.

13. The non-transitory computer readable storage medium of claim 8, wherein the values that describe the orientation of the camera is calculated using an intrinsic matrix that is characterized based on at least the second location of the landmark and the third location of the pixel.

14. The non-transitory computer readable storage medium of claim 8, wherein the landmark in the image is detected by:
performing a first determination that the landmark is within a field of view of the camera and that the landmark is oriented towards the camera;
detecting, after the first determination, the landmark in the image.

15. An image processing apparatus, comprising:
a processor configured to:
obtain an image from a camera located on a vehicle;
determine a first location of the vehicle based on information associated with the image;
obtain a second location of a landmark based on the first location of the vehicle,
wherein the second location of the landmark is obtained using a map and the first location of the vehicle,
wherein the map is queried to provide one or more landmarks located within a distance of the first location of the vehicle, and
wherein the one or more landmarks includes the landmark;
determine a third location of a pixel that include at least some of the landmark detected in the image; and
calculate values that describe an orientation of the camera based on the third location of the pixel and the second location of the landmark.

16. The image processing apparatus of claim 15, wherein the third location of the pixel is a geometric center of a plurality of pixel locations that include at least some of the landmark in the image.

17. The image processing apparatus of claim 15, wherein the camera is mounted at a fixed location on the vehicle and has a fixed direction in which the camera is pointed.

18. The image processing apparatus of claim 15, wherein the second location of the landmark is within a pre-determined distance from the first location of the vehicle.

19. The image processing apparatus of claim 15, wherein the information associated with the image includes a time when the image is obtained.

20. The image processing apparatus of claim 15, wherein the landmark in the image is detected by the processor configured to:
- perform a first determination that the landmark is within a field of view of the camera and that the landmark is oriented towards the camera;
- detect, after the first determination, the landmark in the image.

\* \* \* \* \*